United States Patent Office 3,391,592
Patented July 9, 1968

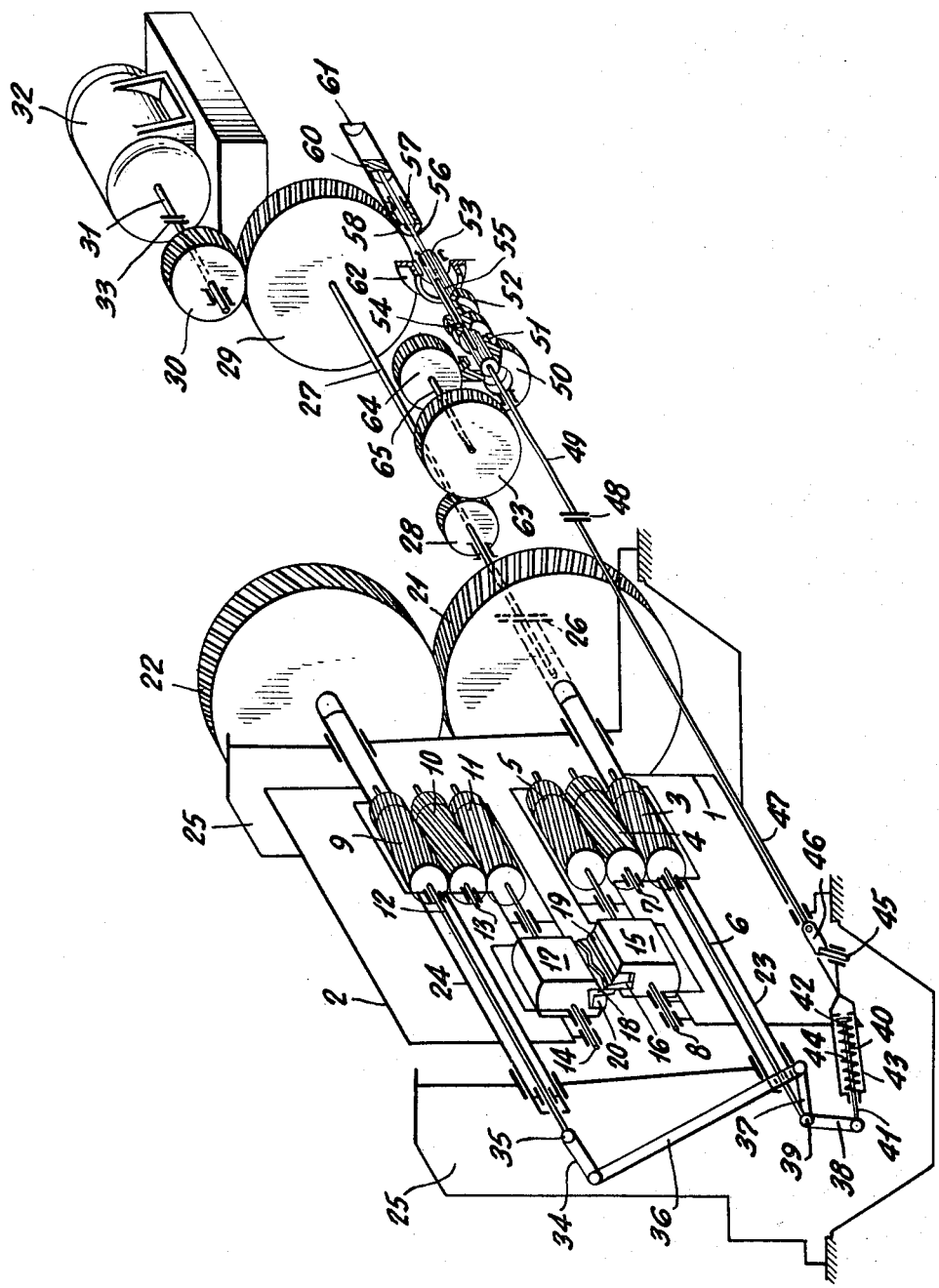

3,391,592
ROTARY FLYING SHEARS
Alexandr Ivanovich Tselikov, ulitsa Chernyakhovskogo 4, kv. 127; Evgeny Alexandrovich Zhukevich-Stosha, Prospect Mira 43, kv. 5; Nikolai Ivanovich Krylov, Volgogradsky prospect 171, kv. 31; and Boris Vasilievich Popov, ulitsa Zelenodolskaya 24, kv. 110, all of Moscow, and Pavel Ivanovich Sidorov, Moskovskoi obl., ulitsa Kalinigradskaya 15, kv. 3, Mytischi, U.S.S.R.
Filed July 20, 1965, Ser. No. 473,322
4 Claims. (Cl. 83—305)

The present invention relates to rotary flying shears intended for dividing moving material, mainly rolled stock, and provided with a planetary cutting mechanism.

There are known flying dividing shears complete with planetary cutting mechanism where the no cut or miscut period is brought about with the aid of a synchronous swivel of sun shafts of planetary mechanisms which are interconnected by gears and driven from individual motors.

These shears are disadvantageous in that they develop great dynamic loads growing in proportion to the rolling rate owing to a great flywheel moment of the gears which does not allow for an increase in the speed of movement of metal to be cut since the shafts of the sun gears develop the stresses which exceed the permissible limit.

There are also known rotary flying shears with a planetary cutting mechanism and a miscut mechanism which operates owing to a synchronous swivel of the sun shafts of the planetary mechanisms driven from an individual motor nad interconnected by a link and lever arrangement made according to a parallelogram linkage system.

Such shears are disadvantageous in that during the no-cut period the parallelogram-type link-and-lever arrangement makes the blades move apart and to opposite sides with respect to the direction of movement of the metal to be cut, owing to which the blade, set in the head turning so as to meet the moving article when it leaves the cutting zone, occurs in the direction opposite to the moving metal for a certain moment and becomes an obstacle for it, thus producing an additional load both for the cutting mechanism and the miscut mechanism.

This calls for an additional reinforcement of construction parts of the above mechanism, in particular of the link-and-lever arrangement which detracts from the advantages existing in this type of connection of the shafts of the sun gears of the planetary mechanisms as compared to the above-mentioned type.

Another disadvantage of such shears is that it is necessary to provide rigid connection between the planetary arrangements of the housings and the miscut mechanism motor.

This causes considerable additional loads acting on the cutting mechanism especially when the linear speed of the blades is higher than that of the stock being cut.

In addition, both types of the above-described rotary dividing shears are disadvantageous in that their no-cut or miscut mechanism is too complicated.

Also the above drawbacks hinder any increase in the speed of movement of the metal to be cut.

The object of this invention is to eliminate the above drawbacks.

The principal object of the invention is to provide rotary flying shears which would allow cutting stock, mainly rolled products, leaving the stand of a continuous billet mill at a rate of about 7 meters per sec.

According to the invention, this object is achieved by an arrangement in which the shafts of the sun gears can be interconnected by a link-and-lever arrangement made, for instance, in the form of an anti-parallelogram which is moved intermittently by a crank gear whose connecting rod, in the preferable embodiment, comprises a member, for instance a spring, capable of changing its own length in proportion to the overloads acting upon the cutting mechanism.

The drawing presents a general view of rotary flying shears in their preferable embodiment.

The cutting mechanism comprises two carriers, housing rolls, a lower one 1 and an upper one 2 between which the product to be cut passes. Mounted inside each carrier or housing is the planetary mechanism. The planetary mechanism of the lower carrier 1 comprises a sun gear 3, an idler gear 4, and a planet pinion 5 set on shafts 6, 7 and 8, respectively, said shafts being mounted in the walls of the lower carrier or housing so that they are capable of revolution.

The planetary mechanism of the upper housing 2 comprises a sun gear 9, an idler gear 10 and a planet pinion 11 respectively set on shafts 12, 13 and 14 mounted so as to be capable of revolving in the walls of the upper housing 2.

The ratio between the sun gears and planet pinions of the planetary mechanisms is equal to 1.

The shaft 8 of the planetary mechanism in the lower housing 1 and the shaft 14 of the planetary mechanism in the upper housing 2 carry the head 15 with the blade 16 and the head 17 with the blade 18, respectively, which are rigidly attached to said planetary shafts with the aid of wedge straps 19 and 20 respectively. The blades 16 and 18 are mounted in the heads 15 and 17 with the axes of the heads so displaced that the resultant of the horizontal and vertical components of the cutting force passes through the head axis.

The lower housing 1 and the upper housing 2 are interconnected with the aid of the meshing gears 21 and 22 with the ratio equal to 1. These gears are fixed on the hollow shafts 23 and 24 respectively while these shafts turn in bearings on the frame 25. Inside the hollow shafts 23 and 24 and in the bearings rigidly connected therewith are the shafts 6 and 12 of the sun gears 3 and 9 of the lower and upper planetary mechanisms respectively. The shaft 23 of the lower housing with the gear 21 is, through the toothed clutch 26, rigidly connected with the drive shaft 27. This latter shaft carries gears 28 and 29, the latter connecting, through the gear 30, the drive shaft 27 with the shaft 31 of the electric motor 32 through the toothed clutch 33.

The miscut or no-cut mechanism comprises a link-and-lever arrangement consisting of a lever 34, whose support 35 is rigidly joined to the sun gear shaft 12, a link 36 and the bell-crank double-arm lever 37, 38 whose support 39 is rigidly joined to the other sun gear shaft 6. The arm 38 of the double-arm lever 37, 38 is connected with the pin 45 of the crank 46 through the elastic connecting rod 40 consisting of a tie rod 41 carrying a disk 42, a hollow housing 43 and biased against disk 4 and a spring 44 set in the hollow housing 43. The force of the spring 44 is so selected that, with the normal loads acting upon the cutting mechanism, the elastic connecting rod is made to act as a rigid member. The crank 46 is set on the shaft 47 which serves as a driving one for it. The shaft 47 is rigidly joined to the co-axial shaft 49 through a toothed clutch 48. Set freely on the shaft 49 is a gear 50 with a driving rim 51 rigidly joined thereto and having teeth on its inside surface, and a block 52 having two externally toothed rims is mounted to move along the splined section 53 of the shaft 49. The block 52 is connected with a tie rod 56 by means of a pin 54 movable in a slot 55 in a splined section 53. The end of the tie rod 56 carries bearings 57 mounted in a sleeve 58 whose bottom is rigidly connected with the rod 59 of the piston 60 of a hydraulic or pneumatic motor cylinder 61.

Co-axially with the shaft 49 and near the block 52 is a braking rim 62 provided with teeth on its internal surface and rigidly joined to some fixed part of the main frame or housing.

The gear 50 is connected with the gear 28 through the gears 63 and 64 set on a countershaft 65. The ratio of the gear drive 28, 63, 64, 50 is an integer greater than unity.

The shears can operate both without no-cut periods, i.e., when each revolution of the housing means a cut, and with no-cut periods, i.e., when each cut corresponds to a few revolutions of the housing which means cutting a blank whose length exceeds that of the blank cut when operating without no-cut periods by as many times as the number of full revolutions performed by the housings or carriers during a period from one cut to the other.

To set the shears for operation without no-cut periods, the block 52 is moved to engage the braking rim 62 through actuation of the hydraulic or pneumatic cylinder 61.

The electric motor 32 started, the drive shaft 27 is set for rotation together with the gears 28 and 29 attached thereto, the shaft 23 of the lower housing 1 and its gear 21 also rotate which is done through the toothed clutch 26 which couples shaft 27 to hollow shaft 23. From gear 28 rotation is transmitted through the gears 63 and 64 to the gear 50 which idles because the no-cut mechanism is disengaged. The gear 21 which is rotated from the hollow shaft 23 transmits rotation to hollow shaft 24, thereby housings 1 and 2 rigidly set on the hollow shafts 23 and 24 respectively are also rotated. The housings serve as guides for countershafts 7 and 13 and shafts 8 and 14 of the pinion gears of the cutting mechanism which are set in the roll housings so as to be capable of rotating therein, whereby the blades 16 and 18 planetate around the fixed sun shafts 6 and 12 of the sun gears, performing a plane-parallel motion and a parallel cut during each revolution of the housings thus cutting the stock which moves between the housings and blades at a speed equal to the linear speed of the blades. All this is done in accordance with the property of the planetary mechanisms described in theory whose ratio between the sun gear and the pinion gear is 1:1. In this case, the length of the cut blank equals the length of the circumference circumscribed by the radii of the axes of the cutting heads.

To set the shears for operation with no-cut periods, the block 52 is shifted to engage with the driving rim 51 of gear 50, again with the aid of the hydraulic or pneumatic cylinder 61.

In this case, when the electric motor 32 is started, gear 28 imparts rotation to the shaft 49 and to the shaft 47 through the engaged toothed clutch 48. Thus this is done with no rigid connection of the tie 56 with the rod 59 of the piston 60 and the latter does not rotate. Rotating together with the shaft 47 is the crank 46 whose revolutions relate to the revolutions of the housings 1 and 2 in accordance with the ratio of the gear drive 28, 63, 64, 50. Thus, when this ratio is equal to two, the crank 46 performs one full revolution while the housings 1 and 2 perform two full revolutions. When the crank 46 revolves, the elastic connecting rod 40, which operates as a rigid member under normal loads, deflects the arm 38 of the bell crank double-arm lever 37, 38 from its extreme left position (as shown in the drawing) corresponding to the working position of the blades 16 and 18, i.e., when the latter are directed perpendicular to the travel of the product. When this occurs the support 39 of the double-arm lever 37, 38 revolves the shaft 6 of the sun gear 3 which, through the idle gear 4 turns the pinion gear 5 and, consequently, the planetary shaft 8 and the head 15 attached thereto having a blade 16 which is thus deflected from its working position.

At the same time, the rising arm 37 of the double-arm lever 37, 38 moves link 36 which via lever 34 causes a turn of the support 35 which is rigidly joined to the sun shaft 12 of the planetary mechanism of the upper housing 2. This turn is performed through the link 36 in the direction opposite to the turn of the support 39. A turning of the sun gear 9 set on shaft 12 causes, through engagement of the idle gear 10, a turning of the pinion gear 11 and, consequently, of the shaft 14 and the head 17 rigidly set thereon which carries the blade 18 so that even though the blades and planet pinion shafts are still planetary said blade 18 is also withdrawn from its working position.

The blades 16 and 18 will be out of their working positions until the crank 46 performs a full revolution, i.e., turns the arm 38 of the double-arm lever 37, 38 to its extreme left position as shown in the drawing.

After the housings 1 and 2 have performed a full revolution and the heads 15 and 17 meet at the moving stock whereas the crank has not performed a full revolution as yet owing to which the blades are deflected from their working positions, no cut is done, i.e., the shears are in the no-cut position. When, however, the crank gear returns to its initial position as shown the blades 16 and 18 also return to their working positions. Thus, the number of no-cut or miscut periods depends on the ratio between the revolution period of the housings 1 and 2 and the crank 46 which, in turn, is governed by the ratio of the gear drive 28, 63, 64, 50. When this ratio is equal to two which means one revolution of the crank 46 per two revolutions of the housings 1 and 2, the stock, moving at a speed equal to the linear speed of blade motion, will be cut into blanks whose length is equal to double the length of the circumference circumscribed by the head axis. If the ratio of the gear drive 28, 63, 64, 50 is three, then the stock will be cut into blanks whose length will be equal to triple the length of said circumference, etc.

The shears proposed herein are also intended for an "out-run" operation, i.e., when the projection of the linear speed of the blades on the axis of the moving stock exceeds the speed of the latter, which allows the stock to be cut into blanks somewhat shorter than the circumference circumscribed by the head axes when operating without no-cut periods, or corresponds to double, triple and the like length of this circumference when operating with no-cut periods. The elastic connecting rod 40 permits such an operation since excessive loads in the cutting mechanism are absorbed by the spring 44. This allows the blades to be operated at a speed exceeding that of the stock being cut by about 20 percent and, consequently, permits shorter blanks to be obtained which greatly widens technological performance of the shears.

What we claim is:

1. Rotary flying shears for cutting moving stock, comprising a cutting mechanism including two carriers arranged on opposite sides of the path of movement of the stock to be cut, a planetary mechanism inside each carrier, each planetary mechanism consisting of a sun gear, an idler gear and a planet gear in respective meshing relationship, shafts for each gear mounted in the carriers so as to be capable of rotating inside such carriers, a head and a shear blade attached to the shafts of each of the planet gears, a single drive motor, drivable means for connecting said motor to said carriers to rotate the same and the planetary mechanisms to cause said blades to shear, a drivable crank mechanism, clutching means operable in one position to engage said crank mechanism with said drivable means, and in another position to disengage said crank mechanism from said drivable means, lever means connected to the shafts of the sun gears, link means interconnecting said lever means to said crank mechanism whereby when said clutching means is in said one position said lever means are driven to rotate said sun gear shafts and thereby the shafts of said planet pinions to place the blades in inoperative position while allowing them to planetate.

2. A rotary flying shear as claimed in claim 1 in which said lever means comprises a single arm lever connected to the sun shaft of one of said planetary mechanisms, a double-arm lever connected intermediate the arms to the sun shaft of the other planetary mechanism, said link being connected between said single arm lever and one arm of said double-arm lever, and the means connecting said one lever means to the crank mechanism being connected to the other arm of said double-arm lever.

3. A rotary flying shear as claimed in claim 2 in which said last-mentioned means includes a resilient connection capable of changing its length in proportion to overloads acting upon the cutting mechanism.

4. A rotary flying shear as claimed in claim 1 and further including a frame means, hollow shaft means journalling said carriers relative to said frame means, said sun shafts including a position disposed within said hollow shaft means and having projecting beyond said frame means, said hollow shaft means being transverse to an offset axially relative to the path of movement of said stock, said lever means comprising a single arm lever connected at one end to the end of one of said sun shafts and extending generally in the direction of movement of the stock, a double-arm lever connected intermediate the arms to the end of the other of said sun shafts, one arm of said double-arm lever extending in the opposite direction as said single arm lever, link means interconnecting the other end of said single arm lever and the end of said one arm of the double-arm lever and the means connecting the crank mechanism to said lever means being connected to the other arm of said double-arm lever.

References Cited

UNITED STATES PATENTS 1,802,554   4/1931   Hahn _____ 83—305

FOREIGN PATENTS 135,328   10/1959   Russia.

ANDREW R. JUHASZ, *Primary Examiner.*